United States Patent [19]

Reichel

[11] 4,178,617
[45] Dec. 11, 1979

[54] SUPPRESSOR-INSULATOR MEMBER AND CIRCUIT ARRANGEMENT THEREFOR

[75] Inventor: Alfred G. Reichel, Wallrabenstein, Fed. Rep. of Germany

[73] Assignee: Black & Decker Inc., Newark, Del.

[21] Appl. No.: 851,873

[22] Filed: Nov. 16, 1977

[30] Foreign Application Priority Data

Jan. 7, 1977 [DE] Fed. Rep. of Germany ....... 2700388
Jan. 7, 1977 [DE] Fed. Rep. of Germany ....... 7700253

[51] Int. Cl.² ............................................. H02H 1/02
[52] U.S. Cl. ..................................... 361/43; 307/105; 310/72; 333/12; 361/23; 361/111
[58] Field of Search ..................... 361/43, 113, 42, 47, 361/48, 49, 50, 23, 110, 111, 31; 333/12, 76, 70 R, 70 CR; 174/5 R, 55 B, 58 G, 138 R, 143; 307/89, 91, 105; 310/68 R, 68 C, 72

[56] References Cited

U.S. PATENT DOCUMENTS

| 1,955,553 | 4/1934 | Labus | 333/76 X |
|---|---|---|---|
| 2,008,377 | 7/1935 | Whitaker | 310/72 X |
| 2,027,067 | 1/1936 | Schubert | 333/76 |
| 2,048,096 | 7/1936 | Bisley | 310/72 X |
| 2,114,102 | 4/1938 | Collins | 310/72 |
| 2,928,012 | 3/1960 | Hurst, Jr. | 307/105 |
| 3,353,124 | 11/1967 | Dilger | 333/76 |
| 3,373,301 | 3/1968 | Black | 310/72 |

FOREIGN PATENT DOCUMENTS

| 549247 | 4/1932 | Fed. Rep. of Germany . | |
|---|---|---|---|
| 1142662 | 1/1963 | Fed. Rep. of Germany . | |
| 1441097 | 3/1969 | Fed. Rep. of Germany | 333/12 |
| 2120452 | 11/1972 | Fed. Rep. of Germany . | |
| 505367 | 5/1939 | United Kingdom | 361/43 |
| 1374606 | 11/1974 | United Kingdom . | |

Primary Examiner—Patrick R. Salce
Attorney, Agent, or Firm—Walter Ottesen; Leonard Bloom; Edward D. Murphy

[57] ABSTRACT

The invention is directed to a circuit arrangement and a suppressor-insulator member for suppressing noise in a portable hand-held electric-powered tool such as a double-insulated tool or the like while at the same time providing electrical insulation between voltage-carrying portion within the tool and an exposed part of the tool accessible to the operator of the tool. The suppressor-insulator member for conducting high-frequency noise from the voltage-carrying portion within the tool to the exposed metal part includes two connecting plates connectable to the voltage-carrying portion and the exposed-metal part respectively; and, a plate-like element of insulating material sandwiched between the connecting plates. The plate-like element has a predetermined thickness and extends outwardly beyond the periphery of the connecting plates so as to cause the element to define a creep-path between the connecting plates of sufficient length to electrically insulate the exposed-metal part from the voltage-carrying portion of the tool.

12 Claims, 4 Drawing Figures

SUPPRESSOR-INSULATOR MEMBER AND CIRCUIT ARRANGEMENT THEREFOR

BACKGROUND OF THE INVENTION

The invention relates to a suppressor which also acts as an insulating member for voltage-conducting parts having user-accessible metal portions. The suppressor-insulator member is especially suitable for electric power tools and apparatus which are double-insulated and have housings which are made in part of metal.

Double insulation is a term used to characterize electric motor driven devices that have been equipped with supplementary insulation as well as functional insulation. Functional insulation denotes the insulation necessary for the proper functioning of the tool and for basic protection against electric shock as for example the conventional winding insulation of the pole pieces; whereas, supplementary insulation denotes an independent insulation provided in addition to the functional insulation, in order to ensure protection against electric shock in the event of failure of the functional insulation. Thus, in a double-insulated tool, if the functional insulation breaks down or is by-passed for some reason, a protective barrier remains to prevent injury to the user. For example, an electric tool can have an electric motor whose armature shaft is normally connected directly to an output element by means of which the tool produces useful work. In addition to the insulation on the wires which are on the armature, the double insulated tool would have a second barrier of insulation between the armature lamination stack and the tool element of the device. The second barrier of insulation provides the supplemental protection against possible injury to the user of the tool and can for example be provided by means of a sleeve positioned on the armature shaft. In other cases, the insulated gears can be provided by building insulating members into the armature shaft. There are of course still other arrangements which can be utilized to provide double insulation.

Further information relating to the insulation terms described herein may be had by making reference to the handbook entitled: "Specification for Hand-Held Motor-Operated Tools" published for the International Commission on Rules for the Approval of Electrical Equipment by Nederlands Comite voor de CEE, Utrechtseweg 310, Arnhem, Netherlands.

Double insulated tools like other tools generate high-frequency noise. This high-frequency noise generated in a power tool has generally two (2) components, namely: a symmetrical component generated internally such as from the brush action; and, a asymmetrical component also generated within the tool by brush action and becomes a problem as a consequence of the impedance to ground of a person holding the tool.

Electric apparatus such as electric power tools driven by electric motors such as drills, circular saws, and the like must be provided with noise suppression means and for this purpose generally capacitors and/or chokes are utilized for short-circuiting or conducting away the high-frequency noise. It is also known to combine capacitors and coils to form a filter which can affect the symmetrical noise component.

However, it is still more difficult to conduct away noise caused by inductive or capacitive action in the machine and wherein the noise appears as asymmetrical. For this purpose, it is already known to use so-called x-y capacitors; that is, a circuit configuration of three capacitors of which the x capacitor is connected between the lines of the source voltage; whereas, the two y capacitors have respective terminals connected to corresponding ones of the lines and with the other respective terminals of these y capacitors mutually connected at a common terminal. This common terminal is then, in turn, connected to a mass such as the laminated stator stack of the field if this stack is electrically insulated with respect to metal parts touchable by the operator of the tool.

It is, however, not permitted to use such an x-y capacitor for short-circuiting noise on operator-accessible metal parts such as the gear housing of a double-insulated drill, since the danger exists that a capacitor can be defective and lead to a voltage break-down from the voltage conducting parts to the operator-accessible metal parts. In order to eliminate this danger, German and international safety requirements call for providing a minimal isolation between the voltage-conducting parts and the operator-accessible metal parts. According to these requirements a definite isolating spacing is required for maintaining a voltage break-down gap of a predetermined length as well as a minimal creep length. Furthermore, the conditions for the leakage current and the resistance to high-voltage must be maintained.

Accordingly, up until now, it was impossible to bleed away high-frequency noise on operator-accessible metal parts or to short circuit the same in a simple manner without clashing with the safety standards.

SUMMARY OF THE INVENTION

In view of the foregoing, it is an object of the invention to provide a means for conducting away this noise voltage while at the same time providing adequate electrical insulation between the voltage conducting parts and the operator-accessible parts.

To achieve this object, a capacitive suppressor which also functions as an insulating member is provided. According to a feature of the invention the suppressor-insulator member includes an insulating plate made of insulating material and arranged between two metal-terminal plates in contact therewith. The insulating plate has a thickness of at least 1 mm and a minimum creep-length of at least 4 mm which extends out over the surface of the insulating plate and joins two respective edge points of the connecting plates.

The suppressor-insulator member according to the invention on the one hand is therefore configured essentially like a capacitor but, on the other hand, meets the insulating standards for joining operator-accessible metal parts with parts which are already insulated once, for example, windings. Furthermore, the suppressor-insulator member according to the invention provides a capacitive effect so that a complete blockage for the low-frequency supply voltage is provided while at the same time the high-frequency noise can be led away over the suppressor-insulator member according to the invention.

Should the suppressor-insulator member of the invention be utilized to connect such parts of the tool, which are not provided with electrical insulation as for example the carbon-brush holder of an electric motor, with the operator-accessible metal parts, then in this instance too, the standards for a strengthened isolation must be observed and the material thickness of the insulating plate can then be at least 2 mm while the creep-length has a length of at least 8 mm.

In order that the suppressor-insulator member has a sufficient capacitance, the thickness of the material making up the insulating plate is selected so as to be as thin as possible; therefore, the proportion of the length of the creep-path to the thickness of the material is preferably at least 4. With a suppressor-insulator member of this type, the insulating plate extends laterally out beyond the metal-terminal plates in order to achieve the desired creep-length while the thickness of the material of the insulating plate either corresponds to the prescribed magnitude or exceeds this magnitude. In order to prevent mechanical damage to the suppressor member and to further increase its isolating capability, the insulating plate and the metal-terminal plates can be cast in insulating material.

BRIEF DESCRIPTION OF THE DRAWING

These and other objects and advantages of my invention will become more apparent from a consideration of the detailed description to follow taken in conjunction with the drawings annexed hereto wherein.

DESCRIPTION OF THE PREFERRED EMBODIMENTS OF THE INVENTION

High-frequency noise is generated in a portable tool by the commutating action of the brushes and commutator of the drive motor of the tool. This noise includes two primary components. One of these components is a line to line component and is known as the symmetrical component of noise. If it is not blocked, the symmetrical component would flow out onto the supply mains supplying the tool. The other primary component is a so-called asymmetrical component which is always present in the tool. The asymmetric component becomes a problem when an operator of the tool grasps the tool at a metal part thereof accessible to the operator because a path to ground is thereby established by the operator's body. The asymmetrical noise path extends through the operator's body impedance to ground and returns back through the ground of the power supply. The circuit is completed back to the tool through the supply mains. The asymmetrical and symmetrical components of noise are disturbing to other consumers such as television sets supplied by the same supply mains feeding the tool.

This invention is applicable to double-insulated tools wherein at least a portion of the housing grasped by the operator is made of metal and is ungrounded. There are inherent stray capacitances within the tool that provide paths for the noise generated by the brushes to reach the metal portion of the case grasped by the operator.

Figure 1:
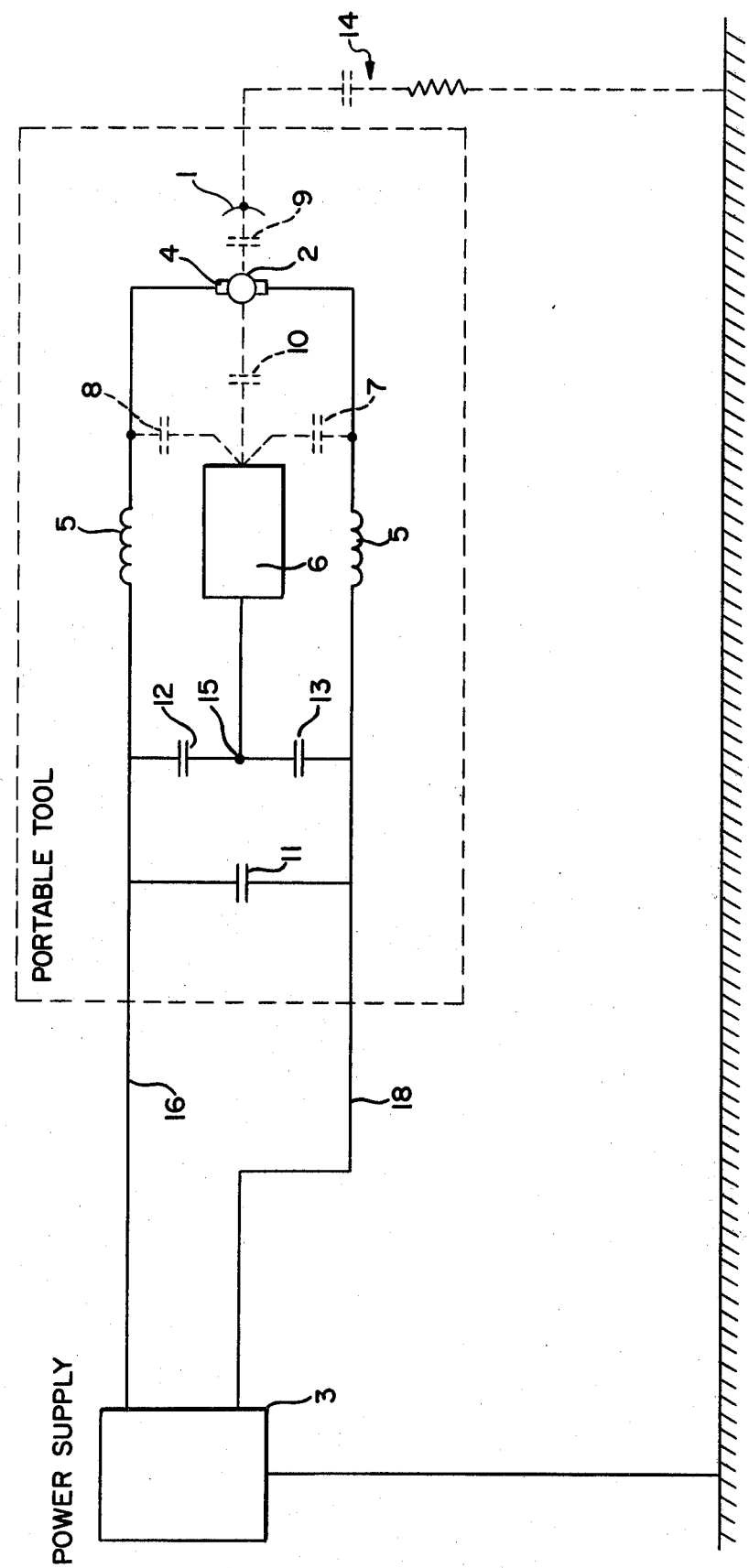
FIG. 1 is a schematic diagram illustrating the capacitance present in an electrical machine having operator accessible parts.

FIG. 1 represents a double-insulated tool equipped with a conventional x-y capacitance arrangement for suppressing symmetrical and asymmetrical noise components. The arc 1 represents the metal part of the tool accessible to the operator of the tool. A motor armature 2 is supplied from a source such as a 110 volt, 60 Hertz power source 3 through supply mains 16 and 18 and brushes 4. The field coils 5 are also excited by the power source 3. The field coils 5 are wound on a laminated stator stack 6. Reference numerals 7 and 8 represent capacitance in the motor between the field coils 5 and the laminated field stack 6 which are inherent from the construction of the motor, and have been shown in broken-line form to emphasize that they are not actual components. The capacitance 9 is likewise an inherent capacitance and exists between the motor armature 2 and the operator-accessible metal housing 1. The impedance 14 represents the impedance of the body of an operator grasping the tool at the housing 1. Reference numeral 10 designates the stray capacitance between the field stack 6 and the armature 2.

The high-frequency noise generated by the motor brushes can be eliminated by providing an open-circuit path for the noise such as a large choke in series with the supply.

Another alternative is to provide a high-frequency short-circuit path by connecting the capacitor 11 across the supply terminals of the motor and thereby provide a path wherein the symmetrical component can circulate. Capacitor 11 is known in the art as an x capacitor.

The capacitors 12 and 13 are known as y capacitors and are components added to provide a path for circulating the asymmetrical component of noise within the tool thereby blocking this component from reaching the supply mains. The common node 15 of the y capacitors is connected directly to the field stack 6. The field stack is not accessible to the operator and can cause him no injury should one of the y capacitors fail. The asymmetrical component circulates in the tool through the y capacitors, the field stack 6, the stray capacitance designated by reference numerals 10, 7 and 8 and the field coils 5. The asymmetrical current will circulate within the tool in this manner so long as the operator has not grasped the tool at the exposed metal part 1.

When the operator grasps the tool at the metal portion 1, a path is placed in parallel to the paths for the asymmetrical component within the tool. Thus, an additional path is provided which circulates a portion of the asymmetrical component away from the tool through capacitance 9, the metal part 1, the impedance 14 of the operator's body, through earth return to the power supply and from there through the supply mains back to the tool. The impedance of the additional path 14 is less than the impedance path within the tool from the common node 15 through the field stack 6 and the set of inherent capacitance 7, 8 and 10 to the field coils 5. Accordingly, the ground return portion of the asymmetrical component flowing in the supply mains 16 and 18 of the power source can be substantial.

It is this ground return current portion of the asymmetrical component which the circuit arrangement and component of the invention minimizes.

It was discovered that if the inherent capacitances 7, 8 and 10 could be by-passed, the impedance of the circulating path within the tool would be much lower than that of the additional path introduced by the operator.

Figure 2:
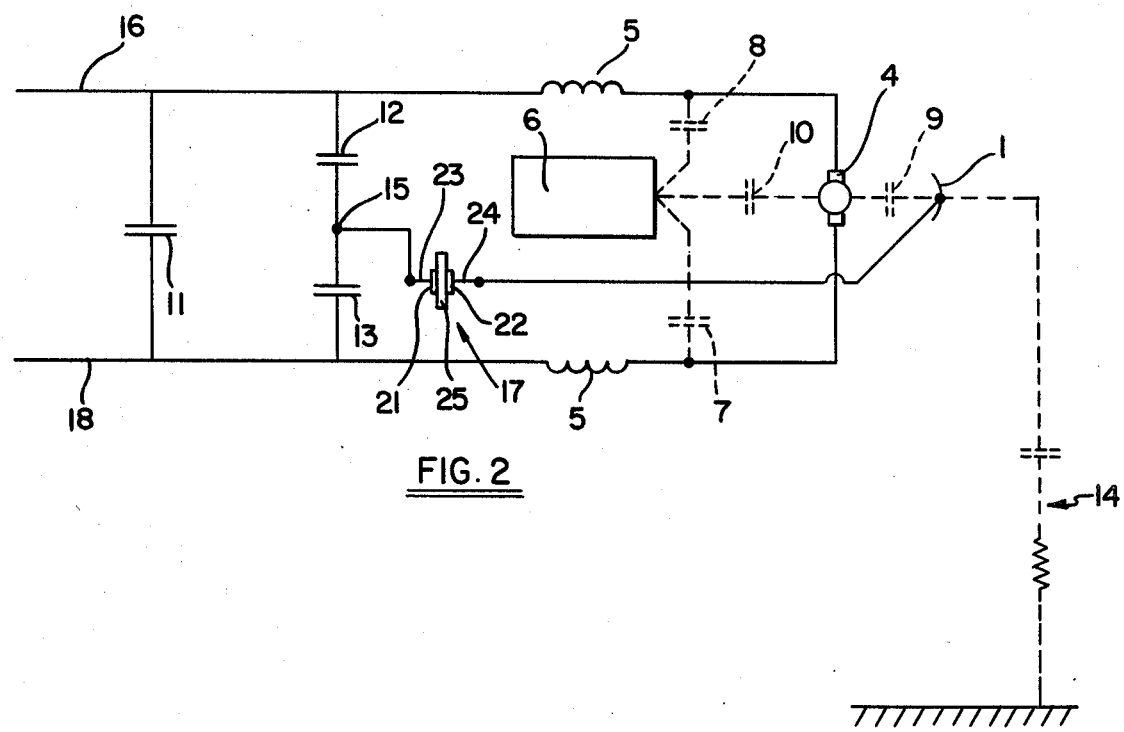
FIG. 2 is a schematic diagram showing the portable tool of FIG. 1 equipped with the suppressor-insulator in a circuit arrangement according to the invention.

According to a feature of the invention, a circuit arrangement as shown in FIG. 2 is provided wherein a suppressor-insulator member 17 is connected from the common node 15 directly to the operator-accessible metal part 1. In this way, the inherent stray capacitances 7, 8 and 10 are by-passed. The inherent capacitance 9 is much larger than the set of inherent capacitances 7, 8 and 10 and impedance of the circulating path within the tool is far less than the impedance through the additional path thereby causing the ground return portion of the asymmetric component to be greatly reduced.

The suppressor-insulator member 17 must also provide adequate electrically insulating qualities in the event that one of the y components shorts and yet provide an impedance sufficiently low so that noise circulating via the ground return is kept low.

Figure 3:
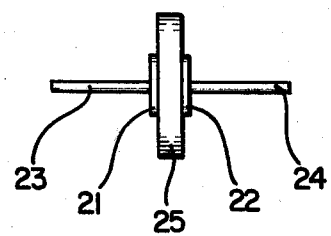
FIG. 3 illustrates an elevation view of a suppressor-insulator according to the invention; and, FIG. 4 is a plan view of the suppressor-insulator shown in FIG. 3.
Figure 4:
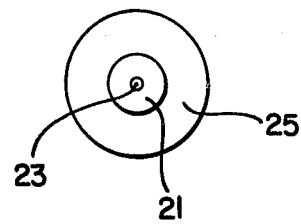

The suppressor-insulator member 17 shown in FIG. 2 is illustrated in detail in FIGS. 3 and 4. The suppressor-insulator member 17 is a capacitive device and is provided with two connecting leads 23 and 24 as well as two metal terminal plates 21 and 22. Between these two plates, a plate 25 is made of insulating material is arranged. The plate 25 is in the form of a circular disc and extends outwardly beyond the connecting plates. The thickness of the material of the insulating plate 25 is so selected that a voltage break-down gap of the described magnitude is obtained, whereas, the lateral projection of the insulating material 25 beyond the terminal plate 21 and 22 together with the thickness of the insulating material 25 beyond the terminal plates 21 and 22 together with the thickness of the insulating plate results in the prescribed creep length; that is, the distance between an edge location on the terminal plate 21 and an edge location on the terminal plate 22 is made up of the sum of the two lateral projecting distances of the insulating plate beyond the terminal plates and the thickness of the insulating plate itself.

According to a preferred embodiment of the invention for achieving an increased electrical insulation, the terminal plates 21 and 22 are made of copper and have a diameter of 5 mm; whereas, the insulating plate 25 has a thickness of 2.1 mm and a diameter of 12 mm. For these dimensions, a ceramic can be utilized which is available as Type K4000 ceramic from the Resista Company of 8300 Landshut, Federal Republic of Germany. This configuration achieves a voltage break-down length of 2.1 mm and a minimal creep length of 9.1 mm so that the prescribed values for reinforced insulation are not only maintained but are exceeded. Reinforced insulating denotes an unimproved functional insulation with such mechanical and electrical qualities that it provides the same degree of protection against electric shock as double insulation.

Referring to FIG. 2, suppression is provided by an x-y capacitor whose x capacitor 11 is connected between lines 16 and 18 for short-circuiting high-frequency noise; whereas, the y capacitor 12 is connected to line 16 and the y capacitor 13 is connected to the line 18. Both y capacitors 12 and 13 are connected to each other as shown. High-frequency noise occurs at the operator-accessible metal parts such as at the metal housing 1. In order to circulate this high-frequency noise within the tool, the common node 15 of the y capacitors 12 and 13 is connected through connecting lead 23 to terminal plate 21 of a suppressor-insulator member according to the invention; whereas, the terminal plate 22 is connected via the connecting lead 24 to the metal housing 1 so that the insulating plate 25 lies between the x-y capacitor and the metal housing 1. The suppressor-insulator member in the illustrated embodiment affords increased insulation and the safety standards for the insulation of operator-accessible metal parts with respect to voltage conducting parts is maintained and there is nonetheless a capacitive connection established between the x-y capacitor and the metal housing 1 in order to direct away high-frequency noise.

The insulating plate 25 is an insulating material such as a ceramic having a very high dielectric constant which permits the of 2 mm thickness to be maintained in combination with a capacity of around 700 $p^F$ with small dimensions.

I claim:

1. In a portable, hand-held, electric-powered tool such as a double-insulated tool or the like having an exposed-metal part accessible to an operator of the tool, an arrangement for suppressing noise in the tool and electrically insulating the exposed-metal part from the electrically conductive parts within the tool comprising:

two y-type filter capacitors serially connected across the input-current supply lines of the tool, said filter capacitors being connected to each other to define a common node; and, a suppressor-insulator member for conducting high-frequency noise away from said filter capacitors, said suppressor-insulator member having two connecting plates and a plate-like element of insulating material sandwiched between said plates, one of said connecting plates being connected to said common node and the other one of said connecting plates being connected to the exposed-metal part of the tool, said plate-like element having a predetermined thickness and extending outwardly beyond the respective peripheries of said connecting plates so as to cause said plate-like element to define a creep-path between said plates of sufficient length to electrically insulate the exposed metal part from the input-current supply lines in the event of a failure of at least one of said y-type filter capacitors.

2. In a portable, hand-held tool of claim 1, said arrangement including an x-type capacitor filter connected across the input-current supply lines.

3. In a portable, hand-held tool of claim 1, said plate-like element having a thickness of at least one (1) millimeter, and said creep-path extending out over the surface of said element from the peripheral edge of said one connecting plate to the peripheral edge of said other connecting plate, said creep-path having a length of at least four (4) millimeters.

4. The suppressor-insulator of claim 1, said thickness being at least two (2) millimeters and said creep-path having a length of at least eight (8) millimeters.

5. The suppressor-insulator of claim 1, the proportion of the length of said creep-path to said thickness being four (4).

6. The suppressor-insulator of claim 1 comprising: a body of insulating material, said plates and said element being cast into said insulating material.

7. In a portable, hand-held, electric-powered tool such as a double-insulated tool or the like having an exposed-metal part accessible to an operator of the tool and being equipped with input current supply means, an arrangement for suppressing asymmetrical noise in the tool and electrically isolating the exposed-metal part from the electrically conductive parts within the tool comprising:

filter means for conducting the asymmetrical noise and being connected across the input current supply means; and, a suppressor-insulator member for conducting said asymmetrical noise away from said filter means, said suppressor-insulator including:

two electrodes and an electrically insulating structure disposed therebetween, one of said electrodes being connected into said filter means and the other one of said electrodes being connected to the exposed-metal part of the tool;

said insulating structure defining a creep-path between said electrodes of sufficient length to electrically isolate the exposed metal part from the input-current supply means in the event of a short-circuit failure in said filter means.

8. The arrangement of claim 7 wherein:

said filter means including two y-type filter capacitors serially connected across the input supply means, said filter capacitors being connected to each other to define a common node; and, said two electrodes being two connecting plates respectively, and said insulating structure being a plate-like element of insulating material sandwiched between said plates, one of said plates being connected to said common node and the other one of said connecting plates being connected to the exposed-metal part of the tool, said plate-like element having a predetermined thickness and extending outwardly beyond the respective peripheries of said connecting plates so as to cause said plate-like element to define said creep-path between said plates of sufficient length to electrically insulate the exposed metal part from the input-current supply means in the event of a failure of at least one of said y-type filter capacitors.

9. The arrangement of claim 8 wherein said plate-like element has a thickness of at least one (1) millimeter, and said creep-path extending out over the surface of said element from the peripheral edge of one of said connecting plates to the peripheral edge of the other one of said connecting plates, said creep-path having a length of at least four (4) millimeters.

10. The suppressor-insulator of claim 8, said thickness being at least two (2) millimeters and said creep-path having a length of at least eight (8) millimeters.

11. The suppressor-insulator of claim 8, the proportion of the length of said creep-path to said thickness being four (4).

12. The suppressor-insulator of claim 8, comprising, a body of insulating material, said plates and said element being cast into said insulating material.

* * * * *